United States Patent
Yamamoto et al.

(10) Patent No.: US 8,527,126 B2
(45) Date of Patent: *Sep. 3, 2013

(54) POWER SUPPLY SYSTEM FOR ELECTRICALLY POWERED VEHICLE AND METHOD FOR CONTROLLING THE SAME

(75) Inventors: Masaya Yamamoto, Kasugai (JP); Norihiko Kato, Handa (JP); Haruki Sato, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 334 days.

This patent is subject to a terminal disclaimer.

(21) Appl. No.: 12/989,364

(22) PCT Filed: Oct. 31, 2008

(86) PCT No.: PCT/JP2008/069860
§ 371 (c)(1),
(2), (4) Date: Oct. 22, 2010

(87) PCT Pub. No.: WO2010/050038
PCT Pub. Date: May 6, 2010

(65) Prior Publication Data
US 2011/0040436 A1   Feb. 17, 2011

(51) Int. Cl.
*B60L 11/18* (2006.01)

(52) U.S. Cl.
USPC ........................................ 701/22; 180/65.265

(58) Field of Classification Search
USPC ................. 701/22, 54, 112; 180/65.1, 65.21, 180/65.265, 65.245, 65.25, 65.28, 65.29, 180/65.285, 65.31; 903/930; 307/10.1
See application file for complete search history.

(56) References Cited

U.S. PATENT DOCUMENTS

| | | | |
|---|---|---|---|
| 5,780,980 A | 7/1998 | Naito | |
| 6,262,903 B1 | 7/2001 | Fujihashi et al. | |
| 6,480,767 B2 | 11/2002 | Yamaguchi et al. | |
| 6,816,759 B2 | 11/2004 | Kimura | |

(Continued)

FOREIGN PATENT DOCUMENTS

| | | |
|---|---|---|
| EP | 1 914 139 A1 | 4/2008 |
| JP | 2002-186195 A | 6/2002 |

(Continued)

OTHER PUBLICATIONS

International Search Report PCT/JP2008/069860, Feb. 3, 2009.

(Continued)

*Primary Examiner* — Marthe Marc-Coleman
(74) *Attorney, Agent, or Firm* — Sughrue Mion, PLLC

(57) ABSTRACT

A power supply system includes a main power storage device and a plurality of sub power storage devices. A converter is connected to selected one of the sub power storage devices to convert voltage between the selected sub power storage device and an electric power feeding line bidirectionally. When a request for switching the selected sub power storage device in use is generated, a converter steps up voltage on the electric power feeding line to a predetermined voltage, and thereafter a process for switching relays is performed. The predetermined voltage is higher than any of a voltage output from the main power storage device and a voltage output from a sub power storage device to be newly connected to the converter. Further, during the process for switching connection of the relays, upper limits on electric power input/output to/from the selected sub power storage device are set to 0.

10 Claims, 9 Drawing Sheets

(56) References Cited

U.S. PATENT DOCUMENTS

| | | |
|---|---|---|
| 6,930,405 B2 | 8/2005 | Gunji |
| 7,332,881 B2 | 2/2008 | Clark et al. |
| 7,653,474 B2 | 1/2010 | Cawthorne et al. |
| 7,672,762 B2 | 3/2010 | Matsubara |
| 7,839,013 B2 | 11/2010 | Nakamura et al. |
| 7,853,386 B2 | 12/2010 | Heap |
| 7,933,694 B2 | 4/2011 | Kato |
| 7,953,525 B2 | 5/2011 | Oyobe et al. |
| 7,962,271 B1 | 6/2011 | Thompson et al. |
| 8,004,104 B2 * | 8/2011 | Hench .................. 290/53 |
| 8,027,759 B2 | 9/2011 | Saeki et al. |
| 8,089,177 B2 | 1/2012 | Kato |
| 2002/0062183 A1 | 5/2002 | Yamaguchi et al. |
| 2004/0006419 A1 | 1/2004 | Kimura |
| 2005/0256631 A1 | 11/2005 | Cawthorne et al. |
| 2006/0058897 A1 | 3/2006 | Senda et al. |
| 2006/0161328 A1 | 7/2006 | Hoshiba et al. |
| 2008/0169785 A1 | 7/2008 | Kim |
| 2008/0215200 A1 | 9/2008 | Toth |
| 2008/0228334 A1 | 9/2008 | Hashimoto |
| 2008/0270023 A1 | 10/2008 | Kumar |
| 2009/0143929 A1 | 6/2009 | Eberhard et al. |
| 2009/0160247 A1 | 6/2009 | Nakamura et al. |
| 2009/0261658 A1 | 10/2009 | Kato |
| 2009/0299560 A1 | 12/2009 | Tomatsuri et al. |
| 2009/0306843 A1 | 12/2009 | Jinno et al. |
| 2010/0094497 A1 | 4/2010 | Oyobe et al. |
| 2010/0100264 A1 | 4/2010 | Kato |
| 2011/0040436 A1 | 2/2011 | Yamamoto et al. |
| 2011/0087395 A1 | 4/2011 | Yamamoto et al. |
| 2011/0178664 A1 | 7/2011 | Yamamoto et al. |
| 2011/0208383 A1 | 8/2011 | Yamamoto et al. |
| 2011/0251745 A1 | 10/2011 | Yamamoto et al. |
| 2011/0257825 A1 | 10/2011 | Yamamoto et al. |
| 2012/0104980 A1 | 5/2012 | Ramu |

FOREIGN PATENT DOCUMENTS

| | | |
|---|---|---|
| JP | 2003-209969 A | 7/2003 |
| JP | 2004-222474 A | 8/2004 |
| JP | 2004-359032 A | 12/2004 |
| JP | 2006-067644 A | 3/2006 |
| JP | 2008-109840 A | 5/2008 |
| JP | 2008-131769 A | 6/2008 |
| JP | 2008-167620 A | 7/2008 |
| JP | 2008-220084 A | 9/2008 |

OTHER PUBLICATIONS

Japanese Office Action (Notice of Allowance) for corresponding JP Patent Application No. 2010-535579 mailed May 22, 2012.

U.S. Office Action for related U.S. Appl. No. 13/126,653 issued on May 24, 2012.

U.S. final Office Action for related U.S. Appl. No. 13/126,653 issued on Dec. 6, 2012.

* cited by examiner

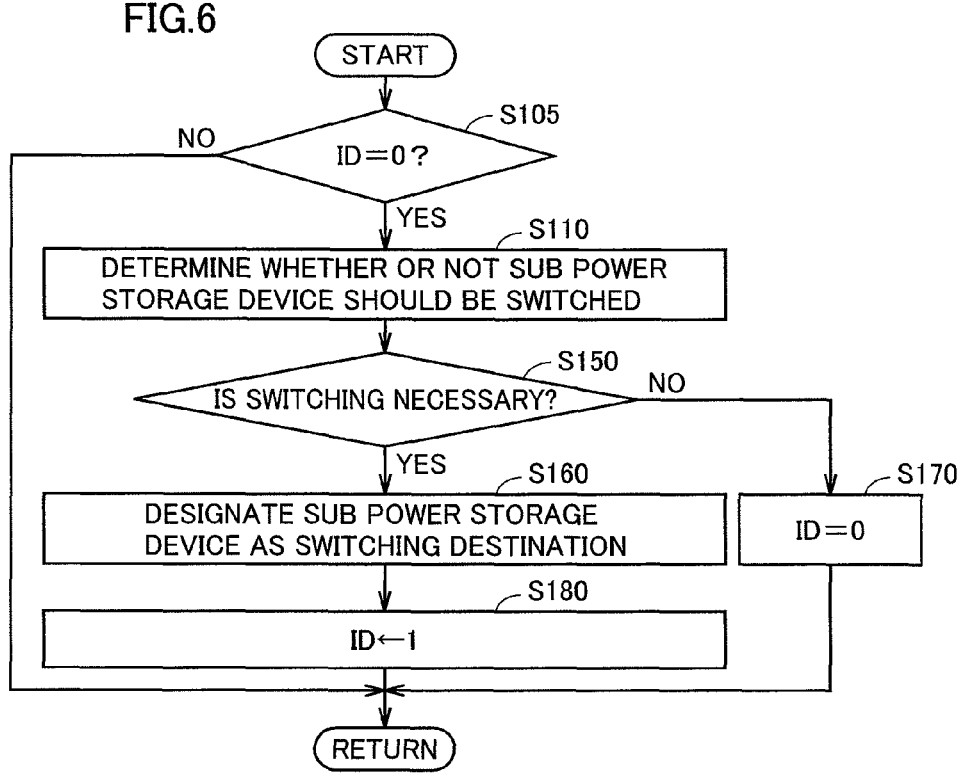
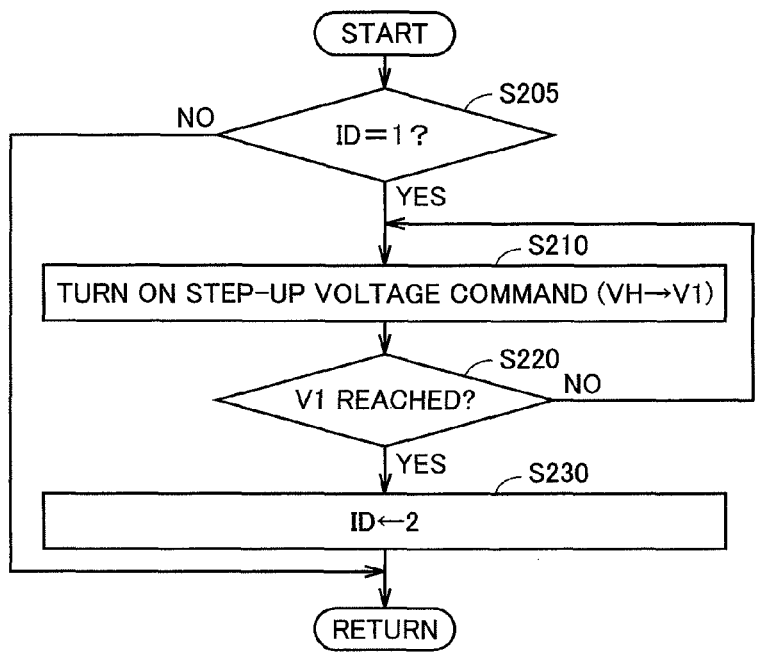

POWER SUPPLY SYSTEM FOR ELECTRICALLY POWERED VEHICLE AND METHOD FOR CONTROLLING THE SAME

TECHNICAL FIELD

The present invention relates to a power supply system for an electrically powered vehicle and a method for controlling the same, and more particularly to control of a power supply system for an electrically powered vehicle equipped with a main power storage device and a plurality of sub power storage devices.

BACKGROUND ART

In recent years, electrically powered vehicles such as electric cars, hybrid cars, fuel cell cars, and the like have been developed into practical use as environmentally friendly vehicles. These electrically powered vehicles are each equipped with an electric motor generating force to drive the vehicle, and a power supply system configured to include a power storage device for supplying electric power to drive the electric motor.

In particular for hybrid cars, there has been proposed a configuration charging a vehicle-mounted power storage device by a power supply external to the vehicle (hereinafter also referred to as an "external power supply"). Accordingly, these electrically powered vehicles have been required to have an increased distance travelable using electric power stored in the vehicle-mounted power storage device. Hereinafter, charging of a vehicle-mounted power storage device by an external power supply will also be referred to simply as "external charging".

For example, Japanese Patent Laying-Open No. 2008-109840 (Patent Document 1) and Japanese Patent Laying-Open No. 2003-209969 (Patent Document 2) describe a power supply system having a plurality of power storage devices (batteries) connected in parallel. The power supply system described in Patent Documents 1 and 2 includes a voltage converter (a converter) provided for each power storage device (battery) for serving as a charging/discharging adjustment mechanism. In contrast, Japanese Patent Laying-Open No. 2008-167620 (Patent Document 3) describes a configuration of a power supply device in a vehicle equipped with a main power storage device and a plurality of sub power storage devices, the power supply device including a converter associated with the main power storage device and a converter shared by the plurality of sub power storage devices. This configuration can achieve a reduced number of elements of the device and also an increased amount of energy that can be stored.

Patent Document 1: Japanese Patent Laying-Open No. 2008-109840
Patent Document 2: Japanese Patent Laying-Open No. 2003-209969
Patent Document 3: Japanese Patent Laying-Open No. 2008-167620

DISCLOSURE OF THE INVENTION

Problems to be Solved by the Invention

In the power supply device described in Patent Document 3, one of the plurality of sub power storage devices is selectively connected to the converter to allow the main power storage device and the selected sub power storage device to supply electric power to drive an electric motor for driving a vehicle. In such a power supply device, when the SOC (State of Charge) of the sub power storage device in use decreases, another sub power storage device is newly connected to the converter. In such a manner, the plurality of sub power storage devices are used sequentially, thereby increasing a travelable distance (EV (Electric Vehicle) travelable distance) achieved by stored electric energy. However, at the time of switching connection of the sub power storage device, it is necessary to perform a switching process through an appropriate process procedure to avoid failure in equipment due to occurrence of a short-circuit path, and the like.

The present invention has been made to solve such problems, and one object of the present invention is to appropriately perform, in a power supply system configured to include a main power storage device and a plurality of sub power storage devices, and a voltage converter (a converter) shared by the plurality of sub power storage devices, a connection switching process for changing a sub power storage device to be used.

Means for Solving the Problems

According to the present invention, a power supply system for an electrically powered vehicle equipped with a motor generating power to drive the vehicle includes a main power storage device, an electric power feeding line, a first voltage converter, a plurality of sub power storage devices provided in parallel to each other, a second voltage converter, a connection unit, and a switching control device. The electric power feeding line is configured to supply electric power to an inverter that controls and drives the motor. The first voltage converter is provided between the electric power feeding line and the main power storage device, and configured to convert voltage therebetween bidirectionally. The second voltage converter is provided between the plurality of sub power storage devices and the electric power feeding line, and configured to convert voltage between one of the plurality of sub power storage devices and the electric power feeding line bidirectionally. The connection unit is provided between the plurality of sub power storage devices and the second voltage converter, and configured to selectively connect a sub power storage device selected from the plurality of sub power storage devices to the second voltage converter. The switching control device is configured to control selective connection between the plurality of sub power storage devices and the second voltage converter. The switching control device includes a switching determination unit, a first electric power limiter unit, a connection switching control unit, and a second electric power limiter unit. The switching determination unit is configured to determine whether or not the selected sub power storage device should be switched based on states of charge of the plurality of sub power storage devices. A step-up-voltage instruction unit is configured to instruct the first voltage converter to provide a voltage on the electric power feeding line to be a first voltage higher than a voltage output from the main power storage device and a voltage output from a sub power storage device to be connected to the second voltage converter after switching, when the switching determination unit determines that it is necessary to switch the selected sub power storage device. The first electric power limiter unit decreases values of upper limits on electric power input/output to/from the selected sub power storage device gradually to zero after the voltage on the electric power feeding line has reached the first voltage. The connection switching control unit is configured to switch connection between the plurality of sub power storage devices and the second voltage converter, when the first electric power limiter unit sets the values of the upper limits on electric power input/output to zero. The second electric power limiter unit is configured to increase the values of the upper limits on electric power input/output gradually to values corresponding to a state of charge of the sub power storage device newly connected to the second voltage converter after the connection switching control unit switches connection between the plurality of sub power storage devices and the second voltage converter.

Alternatively, in a method for controlling a power supply system for an electrically powered vehicle according to the present invention, the power supply system includes the main power storage device, the electric power feeding line, the first voltage converter, the plurality of sub power storage devices, the second voltage converter, and the connection unit described above. The method for controlling includes the steps of determining whether or not the selected sub power storage device should be switched based on states of charge of the plurality of sub power storage devices, instructing the first voltage converter to provide a voltage on the electric power feeding line to be a first voltage higher than a voltage output from the main power storage device and a voltage output from a sub power storage device to be connected to the second voltage converter after switching, when the step of determining determines that it is necessary to switch the selected sub power storage device, decreasing values of upper limits on electric power input/output to/from the selected sub power storage device gradually to zero after the voltage on the electric power feeding line has reached the first voltage, switching connection between the plurality of sub power storage devices and the second voltage converter when the step of decreasing sets the values of the upper limits on electric power input/output to zero, and increasing the values of the upper limits on electric power input/output gradually to values corresponding to a state of charge of the sub power storage device newly connected to the second voltage converter after the step of switching switches connection between the plurality of sub power storage devices and the second voltage converter.

Preferably, the step-up-voltage instruction unit continues to instruct the first voltage converter to provide the voltage on the electric power feeding line to be the first voltage until a process for increasing the values of the upper limits on electric power input/output by the second electric power limiter unit ends. Alternatively, the method for controlling further includes the step of continuing to instruct the first voltage converter to provide the voltage on the electric power feeding line to be the first voltage until a process for increasing the values of the upper limits on electric power input/output in the step of increasing ends.

Preferably, the first voltage corresponds to a value of an upper limit on the voltage on the electric power feeding line controlled by the first voltage converter.

According to the power supply system for an electrically powered vehicle and the method for controlling the same described above, at the time of switching connection between the second voltage converter and a sub power storage device, voltage on the electric power feeding line is stepped up to the first voltage higher than any of the voltage output from the main power storage device and the voltage output from a sub power storage device to be newly used, and thereafter the sub power storage device to be newly used can be connected to the second voltage converter. This can prevent formation of a short-circuit path from the sub power storage device to be newly used via the electric power feeding line. Further, the values of the upper limits on electric power input/output to/from the sub power storage device are decreased before switching connection of the sub power storage device, and the values of the upper limits on electric power input/output are caused to return gradually after completion of switching of connection. This can prevent the power supply system from being requested to excessively charge/discharge electric power in a period in which electric power cannot be input/output to/from the sub power storage device due to switching of connection.

Preferably, the switching control device further includes a third electric power limiter unit, and the third electric power limiter unit is configured to temporarily relax charging and discharging limits for the main power storage device in a period from when the first electric power limiter unit starts decreasing the values of the upper limits on electric power input/output to when the connection unit completes switching of connection between the plurality of sub power storage devices and the second voltage converter. Alternatively, the method for controlling further includes the step of temporarily relaxing charging and discharging limits for the main power storage device in a period from when the step of decreasing starts decreasing the values of the upper limits on electric power input/output to when the connection unit completes switching of connection between the plurality of sub power storage devices and the second voltage converter.

With this configuration, charging and discharging limits on electric power of the main power storage device are temporarily relaxed in a period in which electric power cannot be input/output to/from the sub power storage device due to switching of connection of the sub power storage device. This can ensure upper limits on electric power input/output in the entire power supply system.

More preferably, the electrically powered vehicle further includes an internal combustion engine configured to be capable of outputting power to drive the vehicle independently of the motor, and a traveling control unit. The traveling control unit is configured to start the internal combustion engine when total required power for the electrically powered vehicle is greater than a sum of a value of an upper limit on electric power output from the main power storage device and the value of the upper limit on electric power output from the selected sub power storage device.

With this configuration, by appropriately setting the values of the upper limits on electric power input/output at the time of switching connection of the sub power storage device, the power supply system can be prevented from being requested to excessively charge/discharge. In addition, by temporarily relaxing charging and discharging limits for the main power storage device, the internal combustion engine can be prevented from being restarted at the time of switching connection of the sub power storage device.

Effects of the Invention

According to the present invention, in a power supply system configured to include a main power storage device and a plurality of sub power storage devices, and a voltage converter (a converter) shared by the plurality of sub power storage devices, a connection switching process for changing a sub power storage device to be used can be performed appropriately.

BRIEF DESCRIPTION OF THE DRAWINGS

FIG. 6 is a flowchart for illustrating in detail a process performed to determine whether the sub power storage device should be switched, as shown in FIG. 5.

FIG. 7 is a flowchart for illustrating in detail a pre-switching voltage step-up process shown in FIG. 5.

DESCRIPTION OF THE REFERENCE SIGNS

Figure 1:
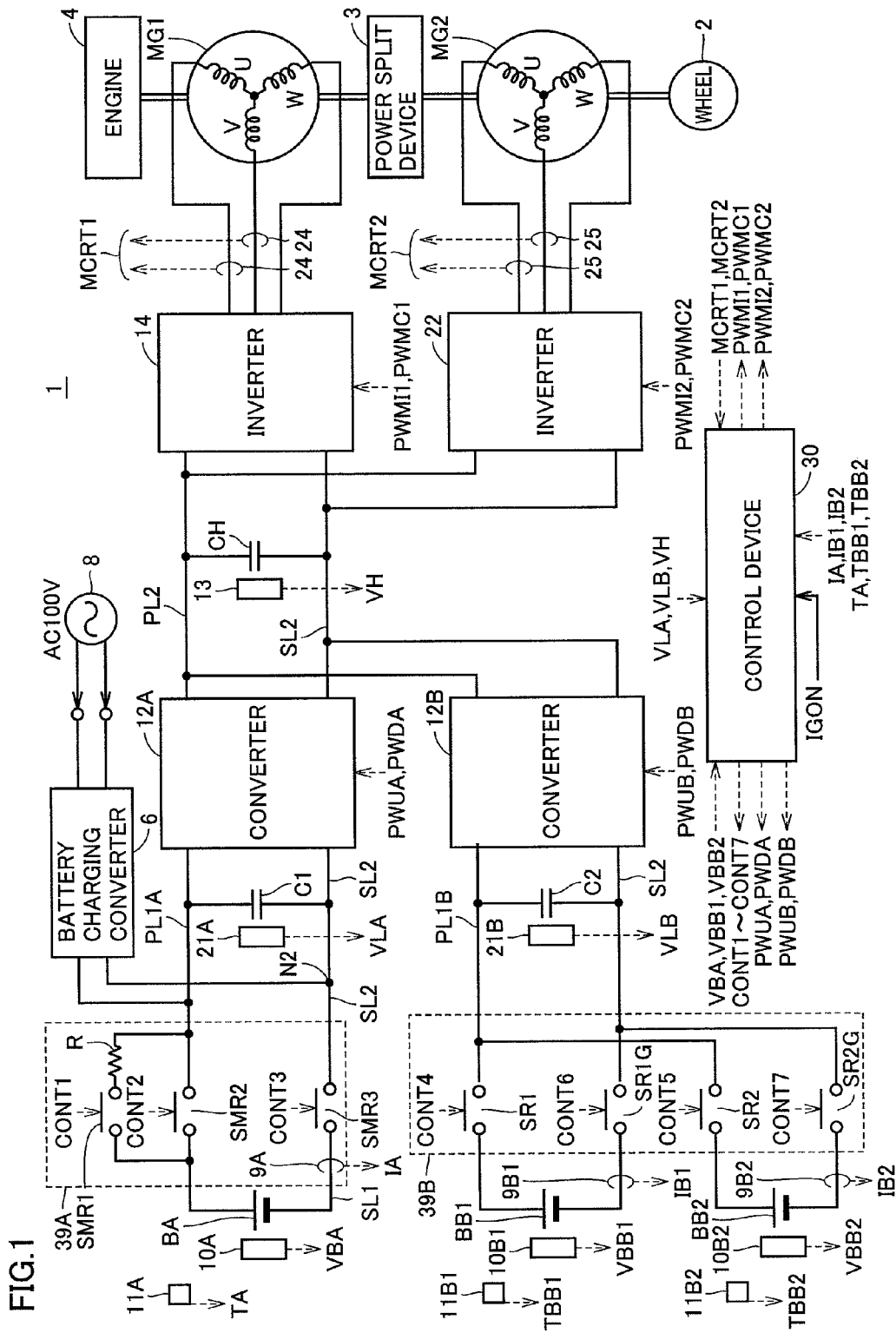
FIG. 1 is a diagram showing a main configuration of an electrically powered vehicle equipped with a power supply system in accordance with an embodiment of the present invention.

1: electrically powered vehicle, 2: wheel, 3: power split device, 4: engine, 6: battery charging converter (external charging), 8: external power supply, 9A, 9B1, 9B2: current sensor, 10A, 10B1, 10B2, 13, 21A, 21B: voltage sensor, 11A, 11B1, 11B2: temperature sensor, 12A: converter (dedicated to main power storage device), 12B: converter (shared by sub power storage devices), 14, 22: inverter, 15-17: each phase arm (U, V, W), 24, 25: current sensor, 30: control device, 39A: connection unit (for main power storage device), 39B: connection unit (for sub power storage device), 100: switching determination unit, 110: step-up-voltage instruction unit, 120: electric power limiter unit (for main power storage device), 130: electric power limiter unit (for sub power storage device), 140: connection switching control unit, 200: converter control unit, 250: traveling control unit, 260: total power calculation unit, 270, 280: inverter control unit, BA: battery (main power storage device), BB: selected sub power storage device, BB1, BB2: battery (sub power storage device), C1, C2, CH: smoothing capacitor, CMBT: step-up-voltage command signal, CONT1 to CONT7: relay control signal, D1 to D8: diode, FBT: flag (stepping up voltage completed), IA, IB1, IB2: input/output current (battery), ID: variable (status of switching process), IGON: start signal, L1: reactor, MCRT1, MCRT2: motor current value, MG1, MG2: motor generator, PL1A, PL1B: power supply line, PL2: electric power feeding line, Pttl: total required power, PWMI, PWMI1, PWMI2, PWMC, PWMC1, PWMC2: control signal (for inverter), PWU, PWUA, PWDA, PWD, PWDA, PWDB: control signal (for converter), Q1 to Q8: IGBT device, R: limiting resistor, SL1, SL2: ground line, SMR1 to SMR3: system main relay, SR1, SR1G, SR2, SR2G: relay, TA, TBB1, TBB2: battery temperature (battery), Tqcom1, Tqcom2: torque command value, UL, VL, WL: line (three phase), V1: predetermined voltage, VBA, VBB1, VBB2: voltage (battery output voltage), VLA, VLB, VH: voltage, VHref: voltage command value (VH), Win: upper limit on electric power input, Win(M): upper limit on electric power input (to main power storage device), Win(S): upper limit on electric power input (to selected sub power storage device), Wout: upper limit on electric power output, Wout(M): upper limit on electric power output (from main power storage device), Wout(S): upper limit on electric power output (from selected sub power storage device).

BEST MODES FOR CARRYING OUT THE INVENTION

Hereinafter reference will be made to the drawings to more specifically describe the present invention in embodiments. In the following description, identical or equivalent components are denoted by identical reference characters and will in principle not be described repeatedly.

FIG. 1 is a diagram showing a main configuration of an electrically powered vehicle equipped with a power supply system in accordance with an embodiment of the present invention.

With reference to FIG. 1, an electrically powered vehicle 1 includes power storage devices implemented as batteries BA, BB1, BB2, connection units 39A, 39B, converters 12A, 12B, smoothing capacitors C1, C2, CH, voltage sensors 10A, 10B1, 10B2, 13, 21A, 21B, temperature sensors 11A, 11B1, 11B2, current sensors 9A, 9B1, 9B2, an electric power feeding line PL2, inverters 14, 22, motor generators MG1, MG2, a wheel 2, a power split device 3, an engine 4, and a control device 30.

A power supply system for the electrically powered vehicle shown in the present embodiment includes a main power storage device implemented as battery BA, electric power feeding line PL2 supplying electric power to inverter 14 driving motor generator MG2, converter 12A provided between the main power storage device (BA) and electric power feeding line PL2 to serve as a voltage converter converting voltage bidirectionally, batteries BB1, BB2 implementing a plurality of sub power storage devices provided in a manner parallel to each other, and converter 12B provided between the plurality of sub power storage devices (BB1, BB2) and electric power feeding line PL2 to serve as a voltage converter converting voltage bidirectionally. The voltage converter (12B) is connected selectively to one of the plurality of sub power storage devices (BB1, BB2) to convert voltage between the connected sub power storage device and electric power feeding line PL2 bidirectionally.

A sub power storage device (one of BB1 and BB2) and the main power storage device (BA) have their storable capacity set so that, for example, when they are concurrently used, they can output maximum power tolerated for an electric load (22 and MG2) connected to the electric power feeding line. This allows the vehicle without using the engine, i.e., traveling as an EV (Electric Vehicle), to travel with maximum power. If the sub power storage device's state of power storage is decreased, the sub power storage device can be exchanged to cause the vehicle to further travel, and if the sub power storage device's electric power has completely been consumed, then, in addition to the main power storage device, the engine can be used to allow the vehicle to travel with maximum power without using the sub power storage device.

Furthermore, such a configuration allows converter 12B to be shared by the plurality of sub power storage devices. This can eliminate the necessity of increasing the number of converters to be equal to that of power storage devices. For further increased EV travelable distance, an additional battery can be introduced in parallel with batteries BB1, BB2.

Preferably, the main power storage device and the sub power storage devices mounted in this electrically powered vehicle are externally chargeable. For this purpose, electrically powered vehicle 1 further includes a battery charging device (a charging converter) 6 for connection to an external power supply 8 which is for example a commercial power supply of AC 100V. Battery charging device 6 converts alternate current into direct current and also adjusts voltage to supply electric power charged to a battery. Note that external charging may be achieved by the above described configuration and in addition a system connecting a neutral point of a stator coil of motor generator MG1, MG2 to an alternate current power supply or a system causing converters 12A, 12B to together function as an AC/DC conversion device.

Smoothing capacitor C1 is connected between a power supply line PL1A and a ground line SL2. Voltage sensor 21A detects a voltage VLA across ends of smoothing capacitor C1 and outputs it to control device 30. Converter 12A can step up the voltage across terminals of smoothing capacitor C1 and supply it to electric power feeding line PL2.

Smoothing capacitor C2 is connected between a power supply line PL1B and ground line SL2. Voltage sensor 21B detects a voltage VLB across ends of smoothing capacitor C2 and outputs it to control device 30. Converter 12B can step up the voltage across terminals of smoothing capacitor C2 and supply it to electric power feeding line PL2.

Smoothing capacitor CH smoothes the voltage stepped up by converter 12A, 12B. Voltage sensor 13 senses a voltage VH across terminals of smoothing capacitor CH and outputs it to control device 30.

Alternatively, in an opposite direction, converters 12A, 12B can step down voltage VH across terminals smoothed by smoothing capacitor CH and supply it to power supply lines PL1A, PL1B.

Inverter 14 receives direct current voltage from converter 12B and/or 12A, converts it into three-phase alternate current voltage, and outputs it to motor generator MG1. Inverter 22 receives direct current voltage from converter 12B and/or 12A, converts it into three-phase alternate current voltage, and outputs it to motor generator MG2.

Power split device 3 is a mechanism coupled to engine 4 and motor generators MG1, MG2 to distribute motive power therebetween. The power split device can for example be a planetary gear mechanism having three shafts of rotation of a sun gear, a planetary carrier, and a ring gear. In the planetary gear mechanism, when two of the three shafts of rotation have their rotation determined, that of the other one shaft of rotation is compulsively determined. These three shafts of rotation are connected to engine 4 and motor generators MG1, MG2 at their respective shafts of rotation, respectively. Motor generator MG2 has its shaft of rotation coupled to wheel 2 by a reduction gear, a differential gear or the like (not shown). Furthermore, power split device 3 may further have a speed reducer incorporated therein for the shaft of rotation of motor generator MG2.

Connection unit 39A includes a system main relay SMR2 connected between the positive electrode of battery BA and power supply line PL1A, a system main relay SMR1 and a limiting resistor R connected in series and connected in parallel with system main relay SMR2, and a system main relay SMR3 connected between the negative electrode of battery BA (a ground line SL1) and a node N2.

System main relays SMR1 to SMR3 have their conduction/non-conduction states controlled (or are turned on/off) by relay control signals CONT1 to CONT3, respectively, issued from control device 30.

Voltage sensor 10A measures a voltage VA across terminals of battery BA. Furthermore, temperature sensor 11A measures a temperature TA of battery BA, and current sensor 9A measures a current IA input/output to/from battery BA. These sensors' measurements are output to control device 30. Based on these measurements, control device 30 monitors a state of battery BA represented by the state of charge (SOC).

Connection unit 39B is provided between power supply line PL1B and ground line SL2, and batteries BB1, BB2. Connection unit 39B includes a relay SR1 connected between the positive electrode of battery BB1 and power supply line PL1B, a relay SR1G connected between the negative electrode of battery BB1 and ground line SL2, a relay SR2 connected between the positive electrode of battery BB2 and power supply line PL1B, and a relay SR2G connected between the negative electrode of battery BB2 and ground line SL2.

Relays SR1, SR2 have their conduction/non-conduction states controlled (or are turned on/off) by relay control signals CONT4, CONT5, respectively, issued from control device 30. Relays SR1G, SR2G have their conduction/non-conduction states controlled (or are turned on/off) by relay control signals CONT6, CONT7, respectively, issued from control device 30. Ground line SL2 extends through converters 12A, 12B toward inverters 14 and 22, as will be described later.

Voltage sensors 10B1 and 10B2 measure voltages VBB1 and VBB2 across terminals of batteries BB1 and BB2, respectively. Temperature sensors 11B1 and 11B2 measure temperatures TBB1 and TBB2 of batteries BB1 and BB2, respectively. Current sensors 9B1 and 9B2 measure currents IB1 and IB2 input/output to/from batteries BB1 and BB2, respectively. These sensors' measurements are output to control device 30. Based on these measurements, control device 30 monitors states of batteries BB1, BB2 represented by the states of charge (SOC).

Battery BA, BB1, BB2 can for example be a lead-acid battery, a nickel metal hydride battery, a lithium ion battery or a similar secondary battery, an electric double layer capacitor or a similar capacitor of large capacity, or the like.

Inverter 14 is connected to electric power feeding line PL2 and ground line SL2. Inverter 14 receives a voltage stepped up from converter 12A and/or converter 12B, and drives motor generator MG1 for example to start engine 4. Furthermore, inverter 14 returns to converters 12A and 12B the electric power generated by motor generator MG1 by motive power transmitted from engine 4. At this time, converters 12A and 12B are controlled by control device 30 to operate as step-down converters.

Current sensor 24 detects a current that flows to motor generator MG1 as a motor current value MCRT1, and outputs motor current value MCRT1 to control device 30.

Inverter 22 is connected to electric power feeding line PL2 and ground line SL2 in a manner parallel with inverter 14. Inverter 22 receives direct current voltage from converters 12A and 12B, converts it into three-phase alternate current voltage, and outputs it to motor generator MG2 driving wheel 2. Furthermore, inverter 22 returns to converters 12A and 12B the electric power generated by motor generator MG2 as the vehicle is regeneratively braked. At this time, converters 12A and 12B are controlled by control device 30 to operate as step-down converters.

Current sensor 25 detects a current that flows to motor generator MG2 as a motor current value MCRT2, and outputs motor current value MCRT2 to control device 30.

Control device 30 is constituted of an electronic control unit (ECU) having a central processing unit (CPU) and a memory (not shown) incorporated therein, and in accordance with a map and a program stored in the memory, uses each sensor's measurement to perform operation processing. Note that control device 30 may have a portion configured to allow an electronic circuit or similar hardware to perform predetermined arithmetic and logical operation processing.

More specifically, control device 30 receives torque command values and rotation speeds of motor generators MG1, MG2, values of voltages VBA, VBB1, VBB2, VLA, VLB, VH, motor current values MCRT1, MCRT2, and a start signal IGON. Then, control device 30 outputs a control signal PWUB instructing converter 12B to step up voltage, a control signal PWDB instructing converter 12B to step down voltage, and a shutdown signal instructing converter 12B to prohibit operation.

Furthermore, control device 30 outputs a control signal PWMI1 instructing inverter 14 to convert direct current voltage output from converters 12A, 12B into alternate current voltage for driving motor generator MG1, and a control signal PWMC1 instructing inverter 14 to convert alternate current voltage generated by motor generator MG1 into direct current voltage and return it toward converters 12A, 12B for regeneration.

Similarly, control device 30 outputs a control signal PWMI2 instructing inverter 22 to convert direct current voltage into alternate current voltage for driving motor generator MG2, and a control signal PWMC2 instructing inverter 22 to convert alternate current voltage generated by motor generator MG2 into direct current voltage and return it toward converters 12A, 12B for regeneration.

Figure 2:
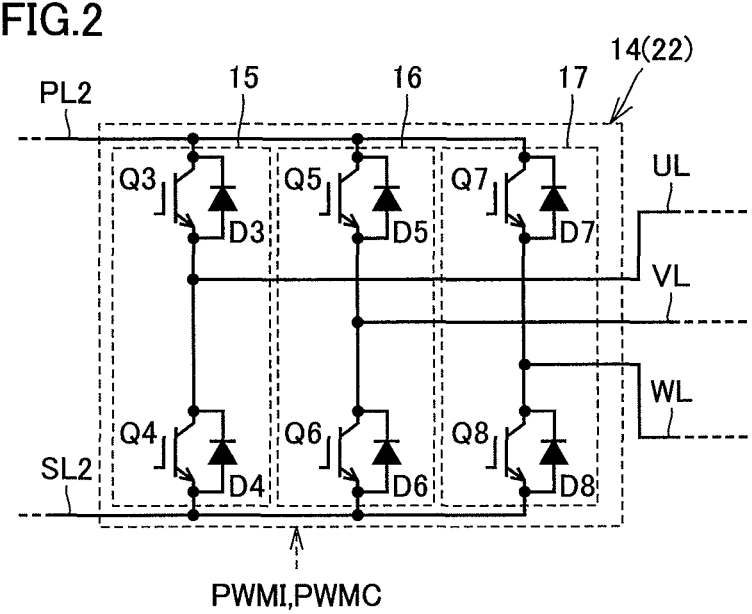
FIG. 2 is a circuit diagram showing a detailed configuration of each inverter shown in FIG. 1.

FIG. 2 is a circuit diagram showing a detailed configuration of inverters 14 and 22 shown in FIG. 1.

With reference to FIG. 2, inverter 14 includes a U phase arm 15, a V phase arm 16, and a W phase arm 17. U phase arm 15, V phase arm 16, and W phase arm 17 are connected between electric power feeding line PL2 and ground line SL2 in parallel.

U phase arm 15 includes insulated gate bipolar transistor (IGBT) devices Q3, Q4 connected in series between electric power feeding line PL2 and ground line SL2, IGBT devices Q3, Q4, and their respective anti-parallel diodes D3, D4. Diode D3 has its cathode connected to IGBT device Q3 at the collector, and its anode connected to IGBT device Q3 at the emitter. Diode D4 has its cathode connected to IGBT device Q4 at the collector, and its anode connected to IGBT device Q4 at the emitter.

V phase arm 16 includes IGBT devices Q5, Q6 connected in series between electric power feeding line PL2 and ground line SL2, and their respective anti-parallel diodes D5, D6. IGBT devices Q5, Q6 and anti-parallel diodes D5, D6 are connected similarly as in U phase arm 15.

W phase arm 17 includes IGBT devices Q7, Q8 connected in series between electric power feeding line PL2 and ground line SL2, and their respective anti-parallel diodes D7, D8. IGBT devices Q7, Q8 and anti-parallel diodes D7, D8 are also connected similarly as in U phase arm 15.

Note that, in the present embodiment, an IGBT device is indicated as a representative example of a power semiconductor switching element controllable to be turned on/off. In other words, it is also replaceable with a bipolar transistor, a field effect transistor or a similar power semiconductor switching element.

Each phase arm has an intermediate point connected to motor generator MG1 at each phase coil at each phase end. In other words, motor generator MG1 is a three-phase permanent magnet synchronous motor, and the three U, V, W phase coils each have one end connected together to an intermediate point. The U phase coil has the other end connected to a line UL drawn from a connection node of IGBT devices Q3, Q4. The V phase coil has the other end connected to a line VL drawn from a connection node of IGBT devices Q5, Q6. The W phase coil has the other end connected to a line WL drawn from a connection node of IGBT devices Q7, Q8.

Inverter 22 shown in FIG. 1 is different in that it is connected to motor generator MG2. However, its internal circuit configuration is similar to that of inverter 14, and accordingly it will not be described repeatedly in detail. Furthermore, FIG. 2 shows an inverter receiving control signals PWMI, PWMC, however, this is to avoid complexity. As shown in FIG. 1, different control signals PWMI1, PWMC1 and control signals PWMI2, PWMC2 are input to inverters 14, 22, respectively.

Figure 3:
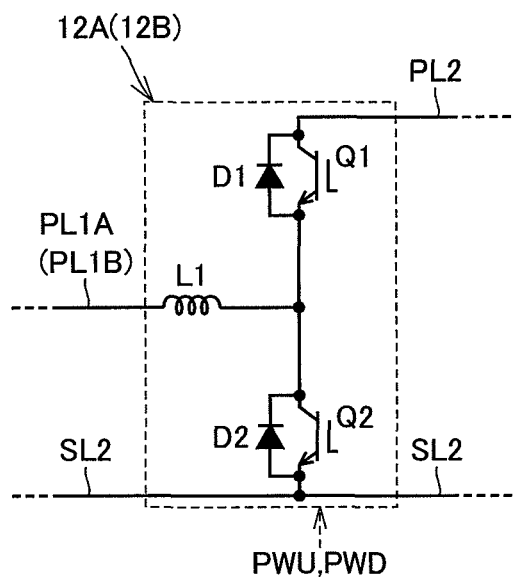
FIG. 3 is a circuit diagram showing a detailed configuration of each converter shown in FIG. 1.

FIG. 3 is a circuit diagram showing a detailed configuration of converters 12A and 12B shown in FIG. 1.

With reference to FIG. 3, converter 12A includes a reactor L1 having one end connected to power supply line PL1A, IGBT devices Q1, Q2 connected in series between electric power feeding line PL2 and ground line SL2, and their respective anti-parallel diodes D1, D2.

Reactor L1 has the other end connected to IGBT device Q1 at the emitter and to IGBT device Q2 at the collector. Diode D1 has its cathode connected to IGBT device Q1 at the collector and its anode connected to IGBT device Q1 at the emitter. Diode D2 has its cathode connected to IGBT device Q2 at the collector, and its anode connected to IGBT device Q2 at the emitter.

Converter 12B shown in FIG. 1 is different from converter 12A in that the former is not connected to power supply line PL1A and instead to power supply line PL1B. However, its internal circuit configuration is similar to that of converter 12A, and accordingly it will not be described repeatedly in detail. Furthermore, FIG. 3 shows a converter receiving control signals PWU, PWD, however, this is to avoid complexity. As shown in FIG. 1, different control signals PWUA, PWDA and control signals PWUB, PWDB are input to inverters 14, 22, respectively.

In the power supply system for electrically powered vehicle 1, battery BA (the main power storage device) and a sub power storage device selected from batteries BB1, BB2 (hereinafter also referred to as a "selected sub power storage device BB"), and motor generators MG1, MG2 supply and receive electric power therebetween.

Control device 30 receives values detected by voltage sensor 10A, temperature sensor 11A, and current sensor 9A, and in accordance therewith sets an SOC(M) indicating the main power storage device's residual capacity, an upper limit on electric power input Win(M) indicating an upper limit value of electric power charged thereto, and an upper limit on electric power output Wout(M) indicating an upper limit value of electric power discharged therefrom.

Furthermore, control device 30 receives values detected by voltage sensors 10B1, 10B2, temperature sensors 11B1, 11B2 and current sensors 9B1, 9B2, and in accordance therewith sets an SOC(B) of selected sub power storage device BB and upper limits on electric power input and output Win(S), Wout(S) thereto and therefrom, respectively.

Generally, an SOC is indicated by a ratio (%) of each battery's current charged amount to its fully charged state. Furthermore, Win, Wout are indicated as such an upper limit value of electric power that, when that electric power is discharged for a predetermined period of time (e.g., for approximately 10 seconds), the battery of interest (BA, BB1, BB2) is not overcharged/overdischarged.

Figure 4:
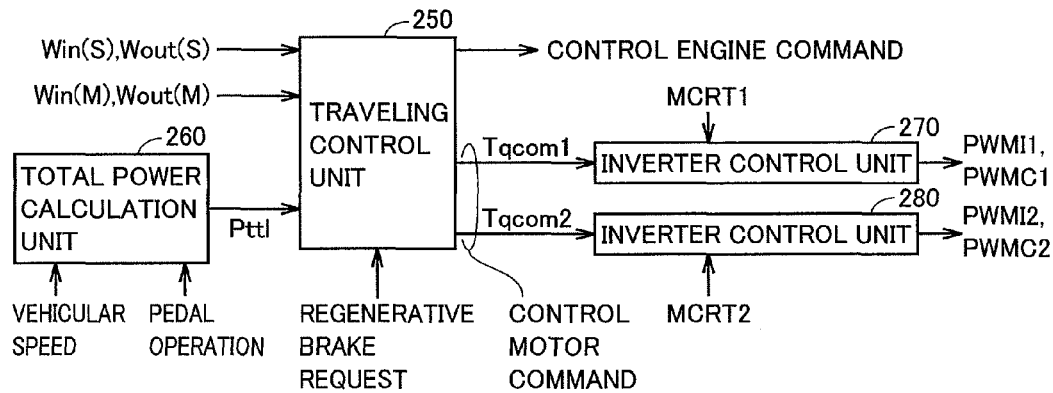
FIG. 4 is a functional block diagram for illustrating how traveling of the electrically powered vehicle is controlled.

FIG. 4 is a functional block diagram for illustrating how control device 30 controls traveling of electrically powered vehicle 1, more specifically, a configuration of power distribution control between engine 4 and motor generators MG1, MG2. FIG. 4 shows function blocks, which are implemented by control device 30 executing a previously stored, predetermined program and/or by processing of an operation by electronic circuitry (hardware) in control device 30.

With reference to FIG. 4, a total power calculation unit 260 calculates total power Pttl required for the entirety of electrically powered vehicle 1 from a vehicular speed and an operation of a pedal (an accelerator pedal). Note that total required power Pttl may also include power required (i.e., the engine's output), depending on the vehicle's condition, for generating electric power by motor generator MG1 to charge a battery.

A traveling control unit 250 receives upper limits on electric power input/output Win(M), Wout(M) to/from main power storage device BA, upper limits on electric power input/output Win(S), Wout(S) to/from selected sub power storage device BB, total required power Pttl from total power calculation unit 260, and a regenerative brake request made when a brake pedal is operated. Traveling control unit 250 generates a control motor command, or torque command values Tqcom1 and Tqcom2, to allow motor generators MG1, MG2 in total to receive/output electric power within a charging limit (Win(M)+Win(S)) and a discharging limit (Wout(M)+Wout(S)) in total for main power storage device BA and selected sub power storage device BB. Furthermore, to ensure total required power Pttl, it is assigned between power provided by motor generator MG2 to drive the vehicle and that provided by engine 4 to do so. In particular, externally charged battery's electric power is maximally utilized to restrict engine 4 from operation, or the power provided by engine 4 to drive the vehicle is set to correspond to a range allowing engine 4 to be highly efficiently operable, to control the vehicle to travel to achieve high fuel-efficiency.

An inverter control unit 270 receives torque command value Tqcom1 and motor current value MCRT1 of motor generator MG1, and therefrom generates control signals PWMI1, PWMC1 for inverter 14. Similarly, an inverter control unit 280 receives torque command value Tqcom2 and motor current value MCRT2 of motor generator MG2, and therefrom generates control signals PWMI2, PWMC2 for inverter 22. Furthermore, traveling control unit 250 generates a control engine command in response to a value requested of power provided by the engine to drive the vehicle, as set. Furthermore, a control device (an engine ECU) (not shown) controls the operation of engine 4 in accordance with the control engine command.

In a travel mode in which the vehicle travels actively using a battery's electric power (i.e., in an EV mode), when total required power Pttl is equal to or smaller than the batteries' total upper limit on electric power output Wout(M)+Wout(S), control device 30 does not operate engine 4, and motor generator MG2 alone provides power to drive the vehicle to travel. When total required power Pttl exceeds Wout(M)+Wout(S), engine 4 is started.

In contrast, in a travel mode in which the EV mode is not selected (i.e., in an HV mode), control device 30 controls distribution of driving power between engine 4 and motor generator MG2 to maintain the batteries' SOC at a predetermined target value. In other words, traveling control under which travel with engine 4 is more actuatable than in the EV mode is carried out.

In the EV mode, charging and discharging are controlled to preferentially use the electric power of selected sub power storage device BB rather than that of main power storage device BA. As such, when the vehicle is traveling and currently used, selected sub power storage device BB is decreased in SOC, selected sub power storage device BB needs to be switched. For example, if battery BB1 is set as selected sub power storage device BB in starting the vehicle, necessity will arise to subsequently disconnect battery BB1 from converter 12B and connect battery BB2 as a newly selected sub power storage device BB to converter 12B, i.e., to perform a connection switching process.

On this occasion, battery BB2 newly set as selected sub power storage device BB generally has an output voltage higher than that of battery BB1 that has been used so far. As a result, connection of a new high-voltage battery may cause occurrence of an unintended short-circuit path, which may pose a problem in protection of equipment and the like. Therefore, in the process for switching connection of the sub power storage device, full attention should be paid to prevent occurrence of a short-circuit path. Further, since supply and recovery of electric power by selected sub power storage device BB cannot be performed during a period of the connection switching process described above, it is required to limit charging and discharging to prevent occurrence of overcharging and overdischarging in the entire power supply system during that period.

Hereinafter, the connection switching process for the sub power storage device with attention being paid to such disadvantages will be described.

Figure 5:
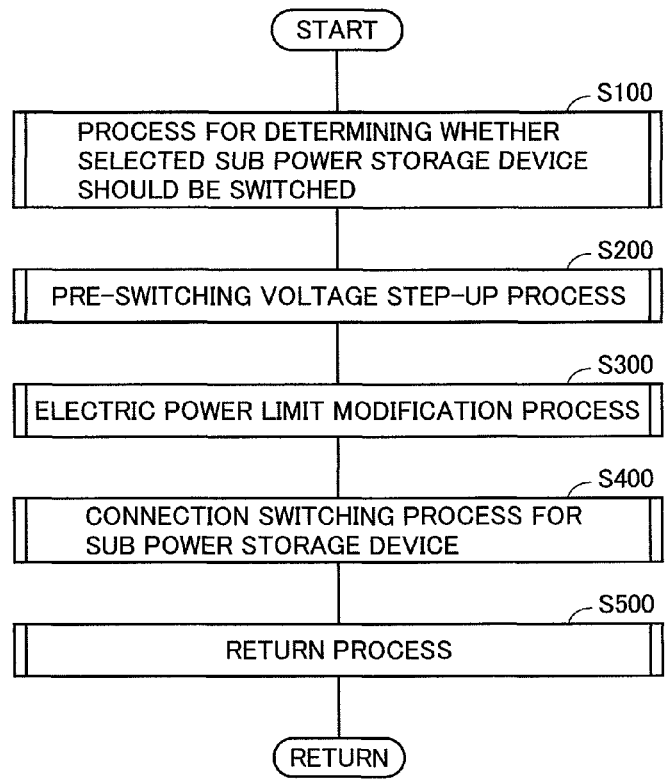
FIG. 5 is a flowchart showing a schematic procedure of a process performed to switch connection of a selected sub power storage device in the power supply system for the electrically powered vehicle according to the embodiment of the present invention.

FIG. 5 is a flowchart showing a schematic procedure of a process performed to switch a selected sub power storage device in the power supply system for the electrically powered vehicle according to the embodiment of the present invention. Furthermore, FIGS. 6 to 10 are flowcharts for specifically illustrating steps S100, S200, S300, S400, and S500 in FIG. 5.

Control device 30 can execute a previously stored, predetermined program periodically as predetermined, to repeatedly perform a control process procedure in accordance with the flowcharts shown in FIGS. 5 to 10, periodically as predetermined. Thereby, the connection switching process for the sub power storage device in the power supply system for the electrically powered vehicle according to the embodiment of the present invention can be implemented.

With reference to FIG. 5, in step S100, control device 30 performs a process for determining whether a selected sub power storage device should be switched. If control device 30 determines that it is necessary to switch the selected sub power storage device, the following steps S200 to S500 are performed. If control device 30 determines in step S100 that it is not necessary to switch the selected sub power storage device, steps S200 to S500 are substantially not performed.

In step S200, control device 30 performs a pre-switching voltage step-up process, and in step S300, control device 30 performs an electric power limit modification process so that a request is not generated to the power supply system to excessively charge/discharge while connection of the sub power storage device is being switched. In step S400, control device 30 performs a connection switching process for actually switching connection between selected sub power storage device BB and converter 12B, and after the process is completed, control device 30 performs in step S500 a return process to start supplying electric power by newly selected sub power storage device BB.

FIG. 6 is a flowchart for illustrating in detail the process performed to determine whether the selected sub power storage device should be switched (S100), as shown in FIG. 5.

As will be described hereinafter, a variable ID is introduced to indicate the progress (i.e., a status) of the connection switching process. Variable ID is set to any of −1 and 0 to 4. ID=0 indicates a state in which no request for switching a sub power storage device is generated. In other words, when ID=0, currently selected sub power storage device BB supplies electric power, while whether selected sub power storage device BB should be switched or not is determined periodically as predetermined. If there is no sub power storage device that can newly be used due to failure in equipment or consumed electric power in the battery, it is assumed that ID is set to −1 (ID=−1).

With reference to FIG. 6, in step S105, control device 30 determines whether ID=0 or not. If ID=0 (YES in S105), in step S110, control device 30 determines whether or not the selected sub power storage device should be switched. Determination in step S110 is basically made based on the SOC of the currently selected sub power storage device. That is, if the SOC of the sub power storage device in use becomes lower than a prescribed reference value, it is determined that the selected sub power storage device should be switched.

In step S150, control device 30 confirms a result of determination in step S110 as to whether switching is necessary or not. When it is determined that switching is necessary (YES in step S150), control device 30 designates selected sub power storage device BB to be newly used in step S160. In a case where two batteries BB1, BB2 are mounted as the sub power storage devices as shown in FIG. 1, newly selected sub power storage device BB is automatically determined without the need to perform the process in step S160. However, in a case where three or more sub power storage devices BB1 to BBn (where n is an integer equal to or greater than 3) are mounted in the configuration of FIG. 1, a new sub power storage device to be used subsequently is designated based on the respective SOCs of the sub power storage devices that are not currently used, and the like. Then, control device 30 sets ID=1 in order to proceed with the connection switching process. Namely, ID=1 indicates a state in which a request for switching selected sub power storage device BB is generated and the switching process is started.

On the other hand, if control device 30 determines in step S110 that it is not necessary to switch the selected sub power storage device (NO in S150), control device 30 maintains ID=0 in step S170. If ID≧1 is once satisfied and the switching process has been started, or if there is no sub power storage device that can newly be used and ID=−1 is set (NO in S105), the processes in steps S110 to S180 are skipped.

FIG. 7 is a flowchart for illustrating in detail the pre-switching voltage step-up process (S200) shown in FIG. 5.

With reference to FIG. 7, in the pre-switching voltage step-up process, control device 30 confirms whether ID=1 or not in step S205. If ID=1, a switching request for switching selected sub power storage device BB is made and the switching process is started (YES in S205), control device 30 generates in step S210 a command to converter 12A to step up voltage VH on electric power feeding line PL2 to a predetermined voltage V1. In response to the step-up voltage command, a voltage command value VHref for electric power feeding line PL2 is set to be equal to V1, and control signal PWUA for converter 12A is generated to implement this voltage command value.

Note that predetermined voltage V1 is set to be higher than any higher one of respective output voltages of main power storage device BA and selected sub power storage device BB to be newly connected (for example, BB2). For example, predetermined voltage V1 set at an upper limit control voltage VHmax that can be stepped up by converter 12A can ensure that voltage VH when a step-up voltage command is issued is higher than both of the output voltages of main power storage device BA and selected sub power storage device BB after switching. Alternatively, in view of reducing a loss caused at converter 12A, predetermined voltage V1 may be determined, as occasion demands, to have a margin, depending on voltages output from main power storage device BA and selected sub power storage device BB after switching at that time.

If the step-up voltage command is generated in step S210, control device 30 determines in step S220 whether or not voltage VH has reached predetermined voltage V1, based on a value detected by voltage sensor 13. Determination as YES is made in step S220, for example, when VH≧V1 continues for a predetermined period of time.

Once voltage VH has reached predetermined voltage V1 (YES in S220), control device 30 furthers the ID from 1 to 2. Until voltage VH reaches V1 (NO in S220), ID=1 is maintained. In other words, ID=2 indicates a state in which the pre-switching voltage step-up process ends and the switching process can be furthered. If ID≠1 (NO in S205), the processes in subsequent steps S210 to S230 are skipped.

Figure 8:
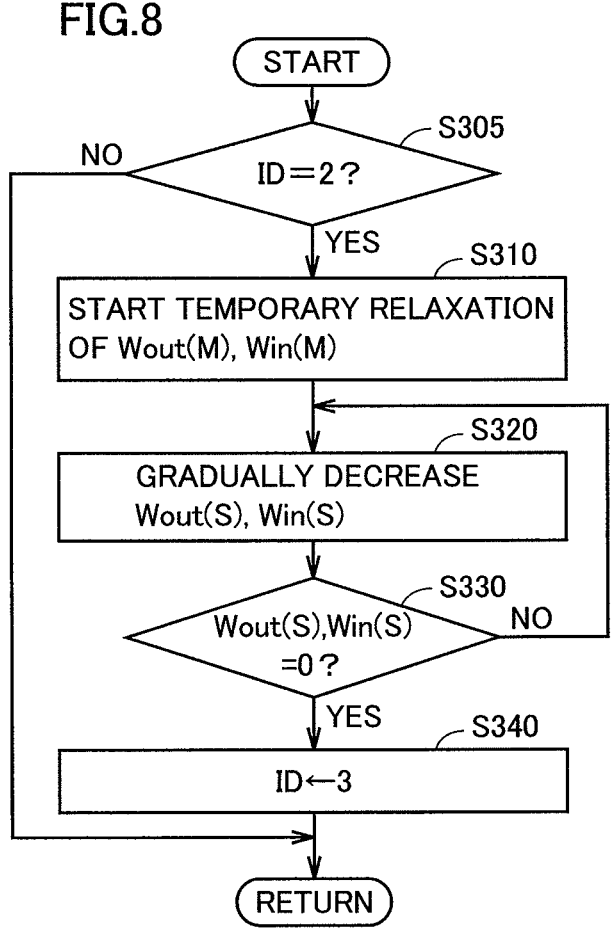
FIG. 8 is a flowchart for illustrating in detail an electric power limit modification process shown in FIG. 5.

Thus, when the pre-switching voltage step-up process (step S200) ends, control device 30 performs the electric power limit modification process as shown in FIG. 8.

FIG. 8 is a flowchart for illustrating in detail the electric power limit modification process (S300) shown in FIG. 5.

With reference to FIG. 8, in the electric power limit modification process, control device 30 initially determines whether or not ID=2 in step S305. If ID=2 is not satisfied (NO in S305), processes in subsequent steps S310 to S340 are skipped.

If ID=2 (YES in S305), control device 30 starts temporary relaxation of charging and discharging limits for main power storage device BA in step S310. Specifically, absolute values of upper limits on electric power input/output Win(M), Wout(M) to/from main power storage device BA are temporarily increased.

Further, in step S320, control device 30 gradually decreases absolute values of upper limits on electric power input/output Win(S), Wout(S) to/from selected sub power storage device BB. For example, Wout(S), Win(S) are decreased gradually toward 0 at a predetermined fixed rate.

In step S330, control device 30 determines whether or not Wout(S), Win(S) have reached 0. Until Wout(S)=Win(S)=0, step S320 is repeated to continuously decrease Wout(S) and Win(S).

Once Wout(S) and Win(S) have reached 0 (YES in S330), control device 30 furthers the ID from 2 to 3 in step S340. In other words, ID=3 indicates a state in which the pre-switching voltage step-up process and the electric power limit modification process have ended and switching of connection between sub power storage devices BB1, BB2 and converter 12B can be started.

When the electric power limit modification process shown in FIG. 8 ends, control device 30 performs the connection switching process for the sub power storage device in step S400.

Figure 9:
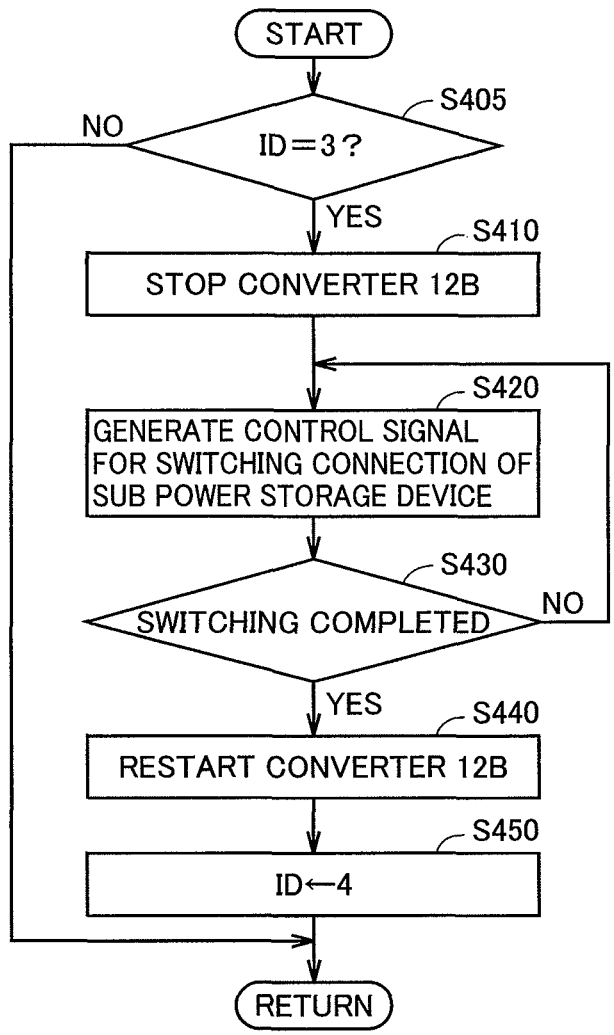
FIG. 9 is a flowchart for illustrating in detail a connection switching process shown in FIG. 5.

FIG. 9 is a flowchart for illustrating in detail the connection switching process for the sub power storage device (S400), as shown in FIG. 5.

With reference to FIG. 9, in the connection switching process for the sub power storage device, control device 30 initially determines whether or not ID=3 in step S405. If ID≠3 (NO in S405), processes in subsequent steps S410 to S450 are skipped.

If ID=3 (YES in S405), control device 30 stops converter 12B to prepare for switching connection of the sub power storage device in step S410. More specifically, in converter 12B, IGBT devices Q1, Q2 are forced to be turned off in response to a shutdown command, and in that condition, control device 30 generates in step S420 a relay control signal for actually switching connection of the sub power storage device. For example, in order to disconnect battery BB1 from converter 12B and connect battery BB2 with converter 12B, relay control signals CONT4, CONT6 are generated to turn off relays SR1, SR1G, and relay control signals CONT5, CONT7 are generated to turn on SR2, SR2G.

Furthermore, in step S430, control device 30 determines whether or not relay connection switching as instructed in step S420 has been completed. When the connection switching has been completed (YES in S430), control device 30 restarts converter 12B to start a switching operation in step S440, and furthers the ID from 3 to 4 in step S450.

In other words, ID=4 indicates a state in which switching of connection between the sub power storage devices and converter 12B by means of the relays has been completed.

When the connection switching process in step S400 ends, control device 30 performs the return process in step S500.

Figure 10:
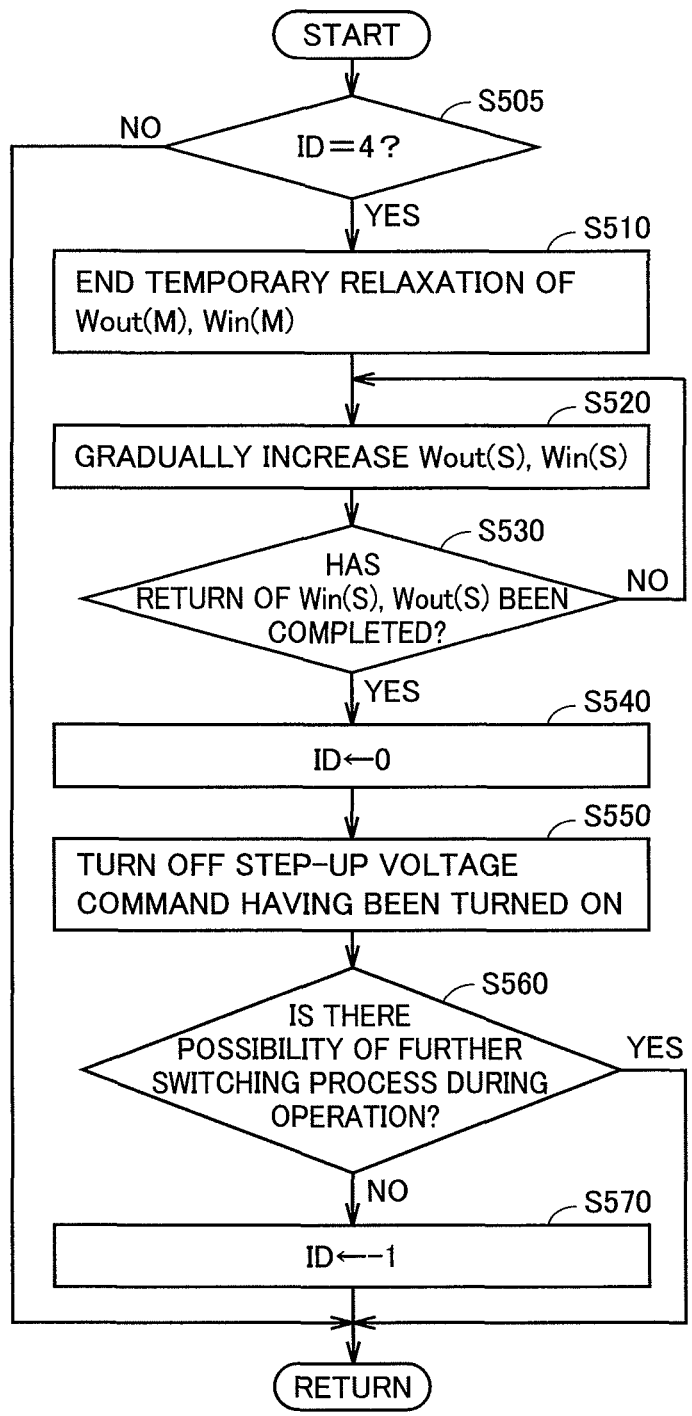
FIG. 10 is a flowchart for illustrating in detail a return process shown in FIG. 5.

FIG. 10 is a flowchart for illustrating in detail the return process (S500) shown in FIG. 5.

With reference to FIG. 10, in the return process, control device 30 initially determines whether or not ID=4 in step S505. If ID≠4 (NO in S505), processes in subsequent steps S510 to S570 are skipped.

If ID=4 (YES in S505), in step S510, control device 30 ends the temporary relaxation of charging and discharging limits for main power storage device BA started in step S310 (FIG. 7). Thereby, Wout(M) and Win(M) basically return to values before the start of the switching process for selected power storage device BB.

Further, control device 30 gradually increases upper limits on electric power input/output Win(S), Wout(S) to/from selected sub power storage device BB decreased to 0 in the electric power limit modification process (step S300), to values of Win, Wout to/from a newly selected sub power storage device (for example, battery BB2).

Then, in step S530, control device 30 confirms whether or not upper limits on electric power input/output Win(S), Wout (S) have returned to the values of Win, Wout to/from newly selected sub power storage device BB. During a period until return is completed (NO in S530), step S520 is repeatedly performed to gradually increase upper limits on electric power input/output Win(S), Wout(S) at a fixed rate.

When return of upper limits on electric power input/output Win(S), Wout(S) is completed (YES in S530), control device 30 returns the ID back to 0 in step S540. Thereby, a state in which normal supply and recovery of electric power by main power storage device BA and newly selected sub power storage device BB can be performed is reproduced in the power supply system.

Further, the process proceeds to step S550 and control device 30 turns off the step-up voltage command generated in step S210 (FIG. 6). Thus, the voltage command value for electric power feeding line PL2 is also set to an ordinary value set in accordance with the states of motor generators MG1, MG2.

After completion of a series of switching processes, control device 30 may further determine whether or not there is a possibility that further switching of the selected sub power storage device is performed during traveling of the vehicle in step S560. If there is no possibility of further switching, control device 30 sets ID=–1 in step S570. If ID=–1 is set, steps S100 to S500 in FIG. 4 are substantially not performed, and thus the switching process for the selected sub power storage device is not started until the vehicle stops operation.

On the other hand, if there is a possibility of further switching, control device 30 skips step S570 and maintains ID=0. As a result, the switching determination process in step S100 is performed periodically as predetermined, and thereby the switching process for the selected sub power storage device is restarted as necessary.

Note that, in the exemplary configuration of FIG. 1 in which only two sub power storage devices are mounted, it is possible to omit the process in step S560, that is, always set ID=–1 once the switching process for the selected sub power storage device is completed, thereby limiting the number of the switching process for the selected sub power storage device performed during driving of the vehicle to only one.

Alternatively, in a power supply system equipped with three or more sub power storage devices or a power supply system having a configuration such that a sub power storage device not in use can be charged during driving of a vehicle, the power supply system can be configured such that a second or later switching process for a selected sub power storage device can be performed by maintaining ID=0 depending on a situation.

Figure 11:
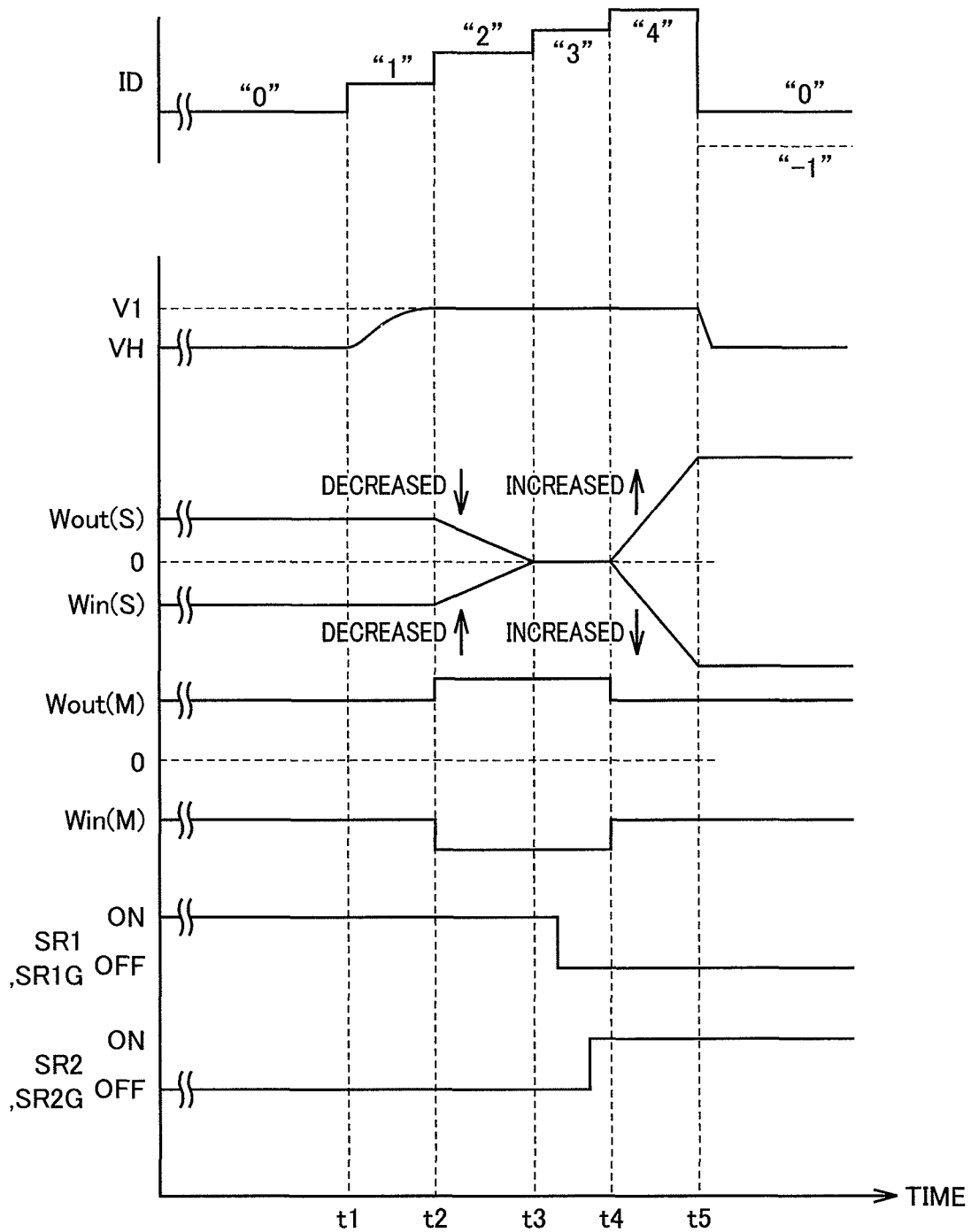
FIG. 11 is a waveform diagram of an operation performed in the process for switching the selected sub power storage device in the power supply system for the electrically powered vehicle according to the embodiment of the present invention.

FIG. 11 shows an operation waveform in the process for switching the selected sub power storage device in the power supply system for the electrically powered vehicle according to the embodiment of the present invention described with reference to FIGS. 5 to 10.

With reference to FIG. 11, during a period until time t1 when ID=0, the switching determination process is performed periodically as predetermined, based on the SOC of the currently selected sub power storage device (e.g., battery BB1).

At time t1, in response to a decrease in the SOC of battery BB1, the switching determination process (step S100) is performed to issue a switching request to switch selected sub power storage device BB, and ID=1 is set to start the switching process.

Thus, the pre-switching voltage step-up process (step S200) is performed and converter 12A increases voltage VH on electric power feeding line PL2 toward predetermined voltage V1. The process for stepping up voltage on electric power feeding line PL2 is completed at time t2, and accordingly, the ID is changed from 1 to 2.

When ID=2 is set, the electric power limit modification process (S300) is performed to temporarily relax charging and discharging for main power storage device BA. Specifically, temporary increase in the absolute values of upper limits on electric power input/output Win(M), Wout(M) is started. Further, upper limits on electric power input/output Win(S), Wout(S) to/from selected sub power storage device BB are decreased toward 0 gradually at a fixed rate. Note that, during this period, converter 12B is controlled to stop charging/discharging of the currently selected sub power storage device (battery BB1). Alternatively, converter 12B may be shut down from time t1.

At time t3, upper limits on electric power input/output Win(S), Wout(S) to/from selected sub power storage device BB are decreased to 0, and in response, the ID is changed from 2 to 3. Once ID=3 is set, the connection switching process for the sub power storage device is started. More specifically, with converter 12A being shut down, relays SR1, SR1G are turned off, and thereafter relays SR2, SR2G are turned on. Then, when the relay connection switching process is completed and battery BB2 as a newly selected sub power storage device is connected to converter 12B, converter 12B is restarted. By completing this connection switching process, the ID is changed from 3 to 4 at time t4.

When ID=4 is set, upper limits on electric power input/output Win(S), Wout(S) to/from selected sub power storage device BB are gradually increased at a fixed rate, and thereby battery BB2 is started to be used as a newly selected sub power storage device. Accordingly, the temporary relaxation of charging and discharging limits for main power storage device BA ends, and Wout(M), Win(M) are basically caused to return to values before time t2.

When Win(S), Wout(S) to/from selected sub power storage device BB return to original values corresponding to Wout, Win from/to battery BB2 at time t5, the ID returns to 0. Then, the process for stepping up voltage on electric power feeding line PL2 is also stopped.

Thereby, a series of switching processes for the selected sub power storage device are completed, and a state in which normal supply and recovery of electric power using selected sub power storage device BB (battery BB2) can be performed is reproduced.

At time t5, if it is determined whether there is a possibility that a further process for switching the sub power storage device is performed during driving of the vehicle, and ID=−1 is set when there is no possibility of occurrence of the switching process as described in FIG. 10, load subsequently imposed on control device 30 can be alleviated.

Figure 12:
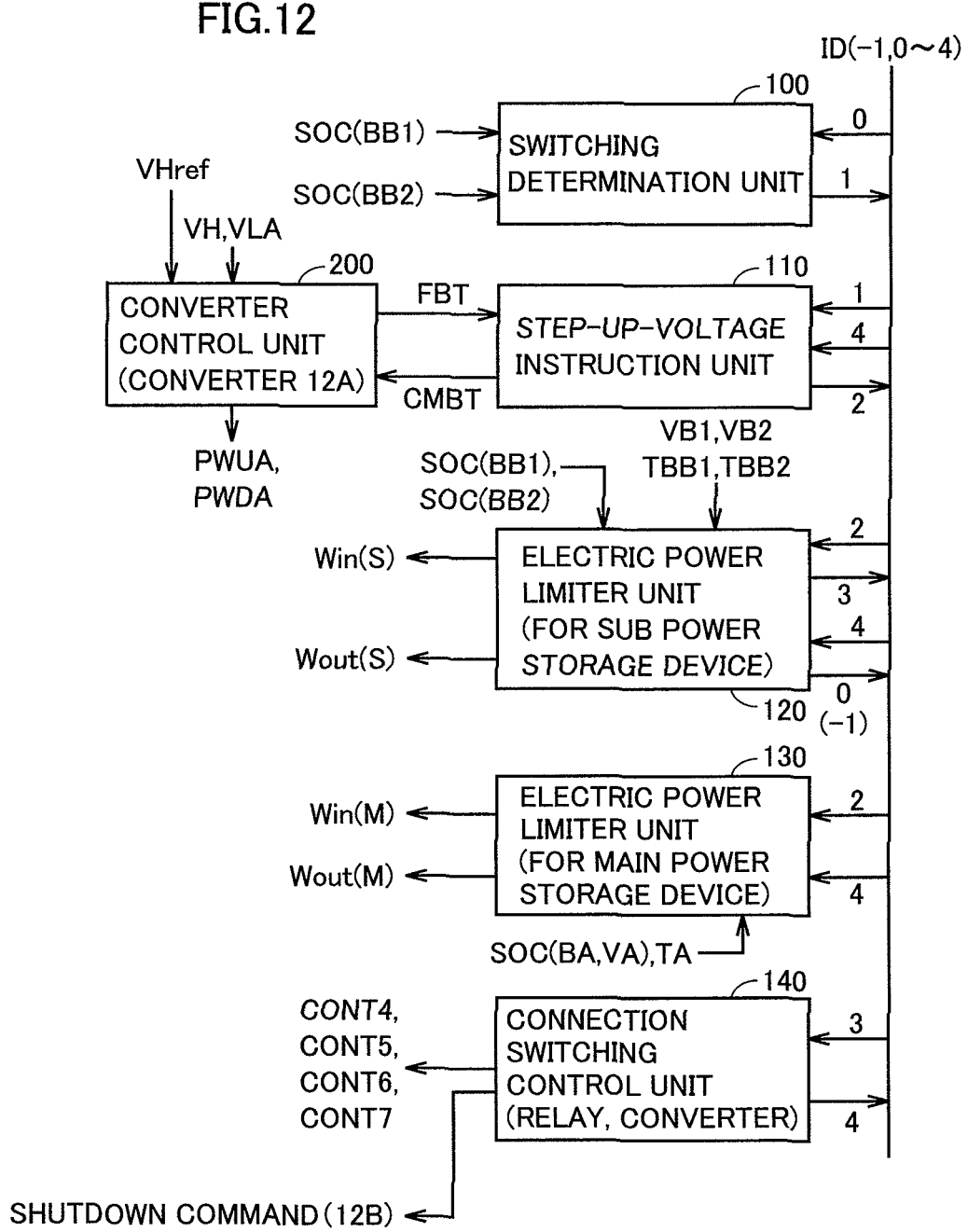
FIG. 12 is a functional block diagram for illustrating a functional portion for the process for switching the selected sub power storage device, in a configuration controlling the power supply system of the embodiment of the present invention.

Next, a configuration of a functional portion for the process for switching the selected sub power storage device described in FIGS. 5 to 10, which a part of a configuration controlling the power supply system of the embodiment of the present invention will be described with reference to FIG. 12. FIG. 12 shows function blocks, which are implemented as control device 30 executing a predetermined program to provide software processing, or by dedicated electronic circuitry (or hardware processing).

With reference to FIG. 12, a switching determination unit 100 receives SOC(BB1), SOC(BB2) indicating the states of charge of batteries BB1, BB2, respectively, and determines whether or not the SOC of selected sub power storage device BB currently in use is lower than a predetermined reference value. When variable ID shared by the function blocks is 0, switching determination unit 100 performs the determination process described above periodically as predetermined, and if it is necessary to switch the selected sub power storage device, switching determination unit 100 changes the ID from 0 to 1. Thus, a request for switching the selected sub power storage device is generated. In other words, switching determination unit 100 has a function corresponding to the process in step S100 in FIG. 5.

When the request for switching the selected sub power storage device is generated and ID=1 is set, a step-up-voltage instruction unit 110 outputs a step-up voltage command signal CMBT to a converter control unit 200 controlling converter 12A.

Converter control unit 200 generates control signals PWUA, PWDA for converter 12A, based on voltages VH, VLA and voltage command value VHref, so that voltage VH on electric power feeding line PL2 reaches voltage command value VHref.

Furthermore, when step-up-voltage instruction unit 110 generates step-up voltage command signal CMBT, converter control unit 200 sets voltage command value VHref=V1 and generates control signal PWUA. If voltage sensor 13 detects voltage VH having reached predetermined voltage V1 continuously for at least a predetermined period of time, converter control unit 200 sets a flag FBT indicating that stepping up voltage is completed, to ON.

In response to flag FBT set to ON, step-up-voltage instruction unit 110 changes the ID to 2, and continues to output step-up voltage command signal CMBT until a connection switching control unit 140, which will be described later, completes relay connection switching and accordingly ID=4 is set. In other words, step-up-voltage instruction unit 110 has a function corresponding to step S200 in FIG. 5 and step S550 in FIG. 10.

An electric power limiter unit 120 sets upper limits on electric power input/output Win(S), Wout(S) to/from selected sub power storage device BB. Normally, upper limits on electric power input/output Win(S), Wout(S) are set based on selected sub power storage device BB or battery's SOC (SOC (BB1) or SOC(BB2)), temperature (TBB1 or TBB2), and output voltage (VB1 or VB2).

In the process for switching the selected sub power storage device, in contrast, when ID=2 is set, electric power limiter unit 120 decreases upper limits on electric power input/output Win(S), Wout(S) gradually at a fixed rate toward 0, and when Win(S), Wout(S) have reached 0, electric power limiter unit 120 changes the ID from 2 to 3. Further, when connection switching control unit 140 sets ID=4, electric power limiter unit 120 increases upper limits on electric power input/output Win(S), Wout(S) to values corresponding to Win, Win of newly selected sub power storage device BB after switching. Then, when the increasing process is completed, electric power limiter unit 120 changes the ID from 4 to 0.

In other words, electric power limiter unit 120 implements the processes in steps S320 to S340 in FIG. 8 and the processes in steps S520 to S540 in FIG. 10, and functions of the "first electric power limiter unit" and the "second electric power limiter unit" of the present invention.

An electric power limiter unit 130 sets upper limits on electric power input/output Win(M) and Wout(M) to/from main power storage device BA. Normally, upper limits on electric power input/output Win(M), Wout(M) are set based on main power storage device BA's SOC (BA), temperature TA, and output voltage VA.

In the switching process for the selected sub power storage device, in contrast, when ID=2 is set, electric power limiter unit 130 temporarily increases the absolute values of upper limits on electric power input/output Win(M) and Wout(M), and thereby temporarily relaxes charging and discharging limits for main power storage device BA. Then, when connection switching control unit 140 sets ID=4, electric power limiter unit 130 causes upper limits on electric power input/output Win(M) and Wout(M) to return to normal values.

In other words, electric power limiter unit 130 implements the processes in step S310 in FIG. 8 and in step S510 in FIG. 10, and a function of the "third electric power limiter unit" of the present invention.

When electric power limiter unit 120 sets ID=3, connection switching control unit 140 generates a command to shut down converter 12B, and also generates relay control signals CONT4 to CONT7 to switch connection between converter 12B and sub power storage devices BB1, BB2. For example, when selected sub power storage device BB is switched from battery BB1 to battery BB2, relay control signals CONT4 to CONT7 are generated to turn off relays SR1, SR1G and turn on relays SR2, SR2G. Once this relay connection switching process is completed, connection switching control unit 140 stops the shutdown command described above to restart converter 12B, and changes the ID from 3 to 4.

Connection switching control unit 140 corresponds to the process in step S400 in FIG. 5 (the processes in S405 to S450 in FIG. 9).

As described above, according to the power supply system for the electrically power vehicle in accordance with the present embodiment, in the process for switching a sub power storage device that is used, voltage on electric power feeding line PL2 is increased and thereafter connection of the sub power storage device is switched. This ensures that connection switching is performed without forming a short-circuit path originating from a newly used sub power storage device in the system. Furthermore, during the switching process for the selected sub power storage device, upper limits on electric power input/output Win(S), Wout(S) to/from selected sub power storage device BB are appropriately limited, which can prevent the power supply system from being requested to excessively charge/discharge. As a result, in a power supply system configured such that a plurality of sub power storage devices share a single voltage converter (a converter), a connection switching process for a sub power storage device performed to switch the selected sub power storage device can be performed appropriately and smoothly.

It should be understood that the embodiment disclosed herein is illustrative and non-restrictive in any respect. The scope of the present invention is defined by the terms of the claims, rather than the description above, and is intended to include any modifications within the scope and meaning equivalent to the terms of the claims.

The invention claimed is:

1. A power supply system for an electrically powered vehicle equipped with a motor generating power to drive the vehicle, comprising:
a main power storage device;
an electric power feeding line supplying electric power to an inverter that controls and drives said motor;
a first voltage converter provided between said electric power feeding line and said main power storage device for converting voltage therebetween bidirectionally;
a plurality of sub power storage devices provided in parallel to each other;
a second voltage converter provided between said plurality of sub power storage devices and said electric power feeding line, for converting voltage between one of said plurality of sub power storage devices and said electric power feeding line bidirectionally;
a connection unit provided between said plurality of sub power storage devices and said second voltage converter, for selectively connecting a sub power storage device selected from said plurality of sub power storage devices to said second voltage converter; and
a switching control device controlling selective connection between said plurality of sub power storage devices and said second voltage converter,
said switching control device including
a switching determination unit determining whether or not said selected sub power storage device should be switched based on states of charge of said plurality of sub power storage devices,
a step-up-voltage instruction unit instructing said first voltage converter to provide a voltage on said electric power feeding line to be a first voltage higher than a voltage output from said main power storage device and a voltage output from a sub power storage device to be connected to said second voltage converter after switching, when said switching determination unit determines that it is necessary to switch said selected sub power storage device,
a first electric power limiter unit decreasing values of upper limits on electric power input/output to/from said selected sub power storage device gradually to zero after said voltage on said electric power feeding line has reached said first voltage,
a connection switching control unit switching connection between said plurality of sub power storage devices and said second voltage converter, when said first electric power limiter unit sets said values of said upper limits on electric power input/output to zero, and
a second electric power limiter unit increasing said values of said upper limits on electric power input/output gradually to values corresponding to a state of charge of the sub power storage device newly connected to said second voltage converter after said connection switching control unit switches connection between said plurality of sub power storage devices and said second voltage converter.

2. The power supply system for an electrically powered vehicle according to claim 1, wherein said step-up-voltage instruction unit continues to instruct said first voltage converter to provide said voltage on said electric power feeding line to be said first voltage until a process for increasing said values of said upper limits on electric power input/output by said second electric power limiter unit ends.

3. The power supply system for an electrically powered vehicle according to claim 1, wherein said first voltage corresponds to a value of an upper limit on said voltage on said electric power feeding line controlled by said first voltage converter.

4. The power supply system for an electrically powered vehicle according to claim 1, wherein said switching control device further includes a third electric power limiter unit temporarily relaxing charging and discharging limits for said main power storage device in a period from when said first electric power limiter unit starts decreasing said values of said upper limits on electric power input/output to when said connection unit completes switching of connection between said plurality of sub power storage devices and said second voltage converter.

5. The power supply system for an electrically powered vehicle according to claim 1, wherein said electrically powered vehicle further includes
an internal combustion engine configured to be capable of outputting power to drive the vehicle independently of said motor, and
a traveling control unit starting said internal combustion engine when total required power for said electrically powered vehicle is greater than a sum of a value of an upper limit on electric power output from said main power storage device and the value of the upper limit on electric power output from said selected sub power storage device.

6. A method for controlling a power supply system for an electrically powered vehicle equipped with a motor generating power to drive the vehicle, said power supply system including a main power storage device, an electric power feeding line supplying electric power to an inverter that controls and drives said motor, a first voltage converter provided between said electric power feeding line and said main power storage device for converting voltage there between bidirectionally, a plurality of sub power storage devices provided in parallel to each other, a second voltage converter provided between said plurality of sub power storage devices and said electric power feeding line, for converting voltage between one of said plurality of sub power storage devices and said electric power feeding line bidirectionally, a connection unit provided between said plurality of sub power storage devices and said second voltage converter, for selectively connecting a sub power storage device selected from said plurality of sub power storage devices to said second voltage converter, and a switching control device controlling selective connection between said plurality of sub power storage devices and said second voltage converter, said method for controlling comprising the steps of:

- determining, with the switching control device, whether or not said selected sub power storage device should be switched based on states of charge of said plurality of sub power storage devices;
- instructing, with the switching control device, said first voltage converter to provide a voltage on said electric power feeding line to be a first voltage higher than a voltage output from said main power storage device and a voltage output from a sub power storage device to be connected to said second voltage converter after switching when said step of determining determines that it is necessary to switch said selected sub power storage device;
- decreasing, with the switching control device, values of upper limits on electric power input/output to/from said selected sub power storage device gradually to zero after said voltage on said electric power feeding line has reached said first voltage;
- switching, with the switching control device, connection between said plurality of sub power storage devices and said second voltage converter when said step of decreasing sets said values of said upper limits on electric power input/output to zero; and
- increasing, with the switching control device, said values of said upper limits on electric power input/output gradually to values corresponding to a state of charge of the sub power storage device newly connected to said second voltage converter after said step of switching switches connection between said plurality of sub power storage devices and said second voltage converter.

7. The method for controlling a power supply system for an electrically powered vehicle according to claim 6, further comprising a step of continuing to instruct said first voltage converter to provide said voltage on said electric power feeding line to be said first voltage until a process for increasing said values of said upper limits on electric power input/output in said step of increasing ends.

8. The method for controlling a power supply system for an electrically powered vehicle according to claim 6, wherein said first voltage corresponds to a value of an upper limit on said voltage on said electric power feeding line controlled by said first voltage converter.

9. The method for controlling a power supply system for an electrically powered vehicle according to claim 6, further comprising a step of temporarily relaxing charging and discharging limits for said main power storage device in a period from when said step of decreasing starts decreasing said values of said upper limits on electric power input/output to when said connection unit completes switching of connection between said plurality of sub power storage devices and said second voltage converter.

10. The method for controlling a power supply system for an electrically powered vehicle according to claim 6, wherein
- said electrically powered vehicle is further equipped with an internal combustion engine configured to be capable of outputting power to drive the vehicle independently of said motor, and
- said internal combustion engine is started when a total required power for said electrically powered vehicle is greater than a sum of a value of an upper limit on electric power output from said main power storage device and the value of the upper limit on electric power output from said selected sub power storage device.

* * * * *